US012515976B2

(12) United States Patent
Yao et al.

(10) Patent No.: US 12,515,976 B2
(45) Date of Patent: Jan. 6, 2026

(54) SYNERGISTIC DEVICE FOR RESOURCE AND ENERGY RECOVERY, POLLUTION REDUCTION AND CARBON REDUCTION OF KITCHEN WASTE

(71) Applicant: Beijing Jiaotong University, Beijing (CN)

(72) Inventors: Hong Yao, Beijing (CN); Shuqi Cheng, Beijing (CN); Shaobin Sun, Beijing (CN)

(73) Assignee: Beijing Jiaotong University, Beijing (CN)

( * ) Notice: Subject to any disclaimer, the term of this patent is extended or adjusted under 35 U.S.C. 154(b) by 362 days.

(21) Appl. No.: 18/229,829

(22) Filed: Aug. 3, 2023

(65) Prior Publication Data

US 2025/0042798 A1    Feb. 6, 2025

(51) Int. Cl.
| | |
|---|---|
| C02F 11/04 | (2006.01) |
| C02F 1/24 | (2023.01) |
| C02F 1/463 | (2023.01) |
| C02F 1/78 | (2023.01) |
| C02F 9/00 | (2023.01) |
| C02F 11/00 | (2006.01) |
| C02F 11/06 | (2006.01) |
| C02F 11/12 | (2019.01) |

(Continued)

(52) U.S. Cl.
CPC ................ *C02F 11/04* (2013.01); *C02F 1/24* (2013.01); *C02F 1/463* (2013.01); *C02F 1/78* (2013.01); *C02F 9/00* (2013.01); *C02F 11/006* (2013.01); *C02F 11/06* (2013.01); *C02F 11/122* (2013.01); *C02F 11/127* (2013.01); *C02F 2001/007* (2013.01); *C02F 2101/16* (2013.01); *C02F 2103/32* (2013.01); *C02F 2209/08* (2013.01); *C02F 2303/24* (2013.01)

(58) Field of Classification Search
CPC .. C02F 11/04; C02F 1/24; C02F 1/463; C02F 1/78; C02F 9/00; C02F 11/006; C02F 11/06; C02F 11/122; C02F 11/127; C02F 2001/007; C02F 2101/16; C02F 2103/32; C02F 2209/08; C02F 2303/24
USPC ................ 210/605, 609, 631, 173, 259, 903
See application file for complete search history.

(56) References Cited

U.S. PATENT DOCUMENTS

2013/0213883 A1*  8/2013  Josse .......................... C02F 3/34
                                                                   210/601

FOREIGN PATENT DOCUMENTS

| CN | 104961302 A | * | 10/2015 | |
|---|---|---|---|---|
| CN | 110092536 A | * | 8/2019 | ................ C02F 9/00 |

(Continued)

OTHER PUBLICATIONS

Machine-generated English translation of CN 110092536, generated on Sep. 11, 2025.*

(Continued)

*Primary Examiner* — Fred Prince
(74) *Attorney, Agent, or Firm* — Bay State IP, LLC

(57) ABSTRACT

A synergistic device for resource and energy recovery, pollution reduction and carbon reduction of kitchen waste is provided, and relates to the technical field of kitchen waste treatment. Main structures of the synergistic device include a pretreatment system, a centrifuge, a flocculation/flotation tank, an anaerobic fermentation tank, an anaerobic ammoniation system, an OAO system and an electrocatalytic ozone synergistic treatment system which are connected in sequence.

10 Claims, 1 Drawing Sheet

(51) Int. Cl.
    *C02F 11/122*     (2019.01)
    *C02F 11/127*     (2019.01)
    *C02F 1/00*     (2023.01)
    *C02F 101/16*     (2006.01)
    *C02F 103/32*     (2006.01)

(56) References Cited

FOREIGN PATENT DOCUMENTS

| | | | | |
|---|---|---|---|---|
| CN | 110668633 A | * | 1/2020 | ............... C02F 9/00 |
| CN | 114871253 A | * | 8/2022 | ............... B09B 3/35 |
| JP | 2019025438 A | * | 2/2019 | |
| KR | 101700707 B1 | * | 1/2017 | ............ F26B 23/004 |
| KR | 101911524 B1 | * | 10/2018 | ............. B02C 23/08 |
| RU | 2570546 C2 | * | 12/2015 | |

OTHER PUBLICATIONS

Machine-generated English translation of JP 2019025438, generated on Sep. 11, 2025.*
Machine-generated English translation of RU 2570546, generated on Sep. 11, 2025.*
Machine-generated English translation of CN 110668633, generated on Sep. 11, 2025.*
Machine-generated English translation of CN 114871253, generated on Sep. 11, 2025.*
Machine-generated English translation of CN 101700707, generated on Sep. 11, 2025.*
Machine-generated English translation of KR 101911524, generated on Sep. 11, 2025.*
Machine-generated English translation of CN 104961302, generated on Sep. 11, 2025.*

* cited by examiner

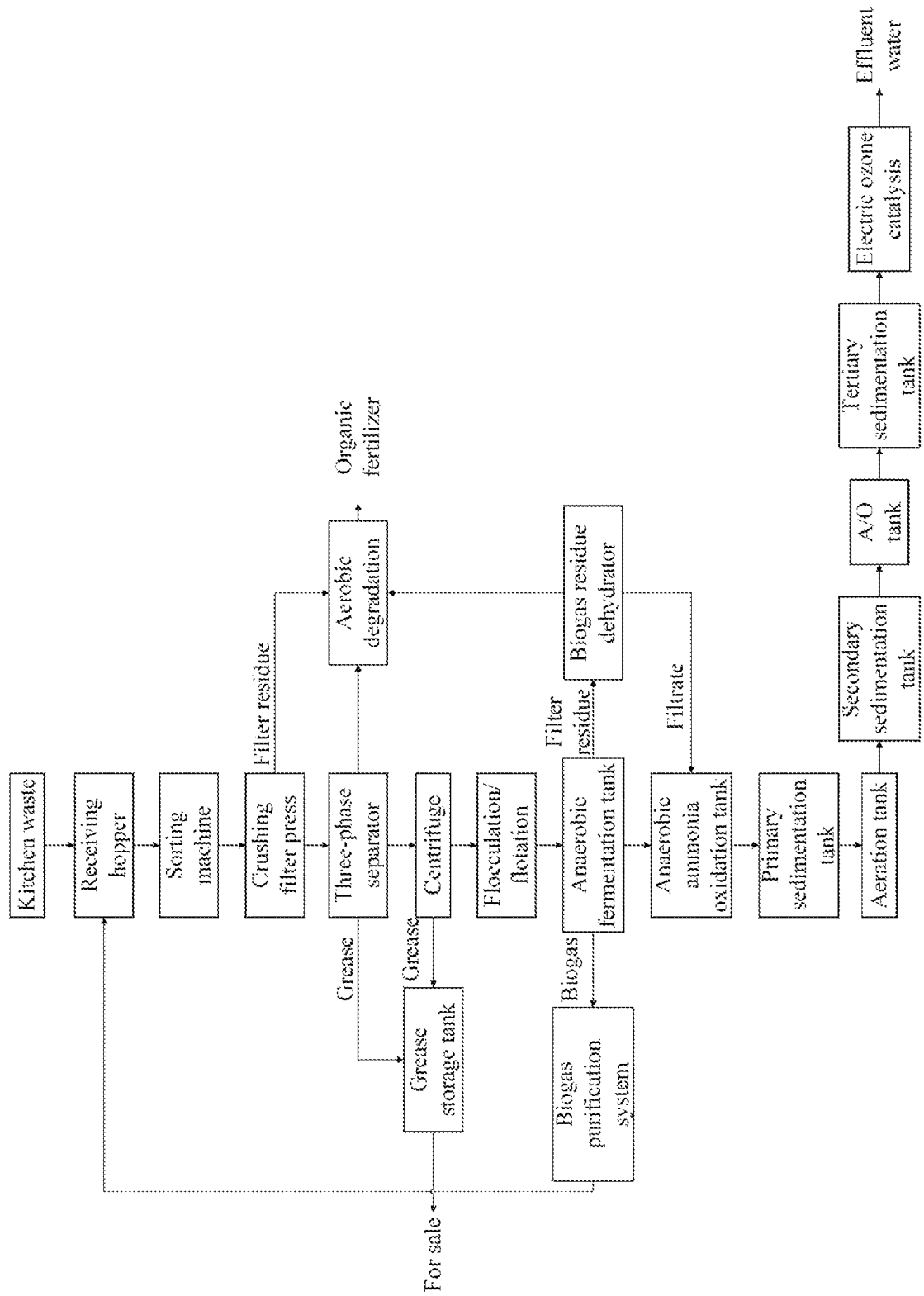

SYNERGISTIC DEVICE FOR RESOURCE AND ENERGY RECOVERY, POLLUTION REDUCTION AND CARBON REDUCTION OF KITCHEN WASTE

TECHNICAL FIELD

The present disclosure relates to the technical field of kitchen waste treatment, in particular to a synergistic device for resource and energy recovery, pollution reduction and carbon reduction of kitchen waste.

BACKGROUND

Kitchen waste is organic waste with high moisture content, high organic content and high grease content. Kitchen waste is produced in a large amount and easily nourished harmful organisms, and is harmful. However, rich organic components in the kitchen waste can be treated to produce resources and energy such as fertilizer, feed and biogas. Therefore, kitchen waste also has great resource property and is a high-value biological resource, and there are more and more researches on resource treatment of kitchen waste all over the world. At present, the production of kitchen waste is increasing year by year. Although the technical level of resource treatment of kitchen waste in China has been improved, there are still problems such as insufficient attention to source reduction, insufficient treatment capacity and low treatment level.

SUMMARY

The present disclosure aims to provide a synergistic device for resource and energy recovery, pollution reduction and carbon reduction of kitchen waste to solve the problem of insufficient technical level in resourceful treatment of kitchen waste. Through a series of technological treatments, resources and energy are recovered from kitchen waste to the maximum extent, so that the pollution discharge is reduced, ecological and economic benefits are obtained, and sustainable development is achieved.

In order to achieve the above purpose, the present disclosure provides the following solutions.

The present disclosure provides a synergistic device for resource and energy recovery, pollution reduction and carbon reduction of kitchen waste, including a pretreatment system, a centrifuge, a flocculation/flotation tank, an anaerobic fermentation tank, an anaerobic ammoniation system, an OAO (Oxic Anoxic Oxic) system and an electrocatalytic ozone synergistic treatment system which are communicated in sequence. The pretreatment system is used for carrying out sorting, crushing, dewatering and solid-liquid separation of kitchen waste. The centrifuge is used for further separating liquid treated by the pretreatment system. The flocculation/flotation tank is used for removing suspended matters and microbubbles from the liquid treated by the centrifuge. The anaerobic fermentation tank is used for removing organic matters in the liquid; the anaerobic ammoniation system is used for removing ammonia nitrogen and total nitrogen in the liquid. The OAO system is used for removing COD (Chemical Oxygen Demand) in the liquid and carrying out denitrification and sludge-water separation. The electrocatalytic ozone synergistic treatment system is used for rapidly degrading the organic matters in the liquid and removing the COD so as to enable waste water to reach a discharge standard.

In some embodiments, the pretreatment system includes a receiving hopper, a sorting machine, a crushing filter press and a three-phase separator which are connected in sequence. The receiving hopper is used for receiving the kitchen waste. The sorting machine is used for carrying out coarse sorting of the kitchen waste. The crushing filter press is used for crushing and dewatering the kitchen waste. The three-phase separator is used for separating water, grease and solid matters from the kitchen waste. A water outlet of the three-phase separator is communicated with the centrifuge.

In some embodiments, the synergistic device further includes an aerobic degradation tank. A filter residue outlet of the crushing filter press and a solid matter outlet of the three-phase separator are respectively communicated with the aerobic degradation tank.

In some embodiments, a biogas outlet of the anaerobic fermentation tank is communicated with a biogas purification system. A filter residue outlet of the anaerobic fermentation tank is communicated with a biogas residue dehydrator. The biogas residue dehydrator is communicated with the aerobic degradation tank. A filtrate outlet of the biogas residue dehydrator is communicated with the anaerobic ammoniation system.

In some embodiments, a slag outlet of the biogas purification system is communicated with the receiving hopper.

In some embodiments, the biogas purification system includes a two-stage desulfurization equipment having a wet desulfurization equipment and a dry desulfurization equipment connected in series. The wet desulfurization equipment adopts processes of alkali spray and biological reaction recovery, and the dry desulfurization equipment adopts an iron oxide process for desulfurization. In case the sulfur content is high, the sulfur content is reduced by the wet desulfurization equipment, and then the desulfurization effect and stability are ensured by the dry desulfurization equipment. In case the sulfur content is low, the dry desulfurization equipment is adopted without adopting the wet desulfurization equipment.

In some embodiments, the anaerobic fermentation tank is a mechanically stirred CSTR (Continuous Stirred Tank Reactor) anaerobic reactor.

In some embodiments, the anaerobic ammoniation system includes an anaerobic ammonia oxidation tank and a primary sedimentation tank which are communicated in sequence. The anaerobic ammonia oxidation tank is communicated with the anaerobic fermentation tank. The primary sedimentation tank is communicated with the OAO system.

In some embodiments, the OAO system includes an aeration tank, a secondary sedimentation tank, an A/O (Anoxic/Oxic) tank and a tertiary sedimentation tank which are arranged in sequence. The aeration tank is communicated the anaerobic ammoniation system. The tertiary sedimentation tank is communicated with the electrocatalytic ozone synergistic treatment system.

In some embodiments, the synergistic device further includes a grease storage tank. The grease storage tank is used for collecting grease separated by the pretreatment system and the centrifuge.

Compared with the prior art, the present disclosure has the following technical effects.

According to the synergistic device for resource and energy recovery, pollution reduction and carbon reduction of kitchen waste in the present disclosure. By means of the resource property of kitchen waste, grease in the kitchen waste is extracted to prepare biodiesel, waste residue is composted to produce organic fertilizer, waste water is subjected to anaerobic fermentation to produce biogas, and the waste water reaches the discharge standard after advanced treatment. Therefore, the whole technological process not only produces resources and energy, but also reduces the discharge of pollutants, and is an advanced harmlessness and recycling technology.

BRIEF DESCRIPTION OF THE DRAWINGS

To more clearly illustrate the embodiment of the present disclosure or the technical scheme in the prior art, the following briefly introduces the accompanying drawings to be used in the embodiment. Apparently, the accompanying drawings in the following description show merely some embodiments of the present disclosure, and those skilled in the art may still derive other drawings from these accompanying drawings without creative efforts.

FIG. 1 is a structural schematic diagram of a synergistic device for resource and energy recovery, pollution reduction and carbon reduction of kitchen waste in the present disclosure.

DETAILED DESCRIPTION OF THE EMBODIMENTS

The following clearly and completely describes the technical solutions in the embodiments of the present disclosure in combination with the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall belong to the scope of protection of the present disclosure.

As shown in FIG. 1, the embodiment provides a synergistic device for resource and energy recovery, pollution reduction and carbon reduction of kitchen waste, including a pretreatment system, a centrifuge, a flocculation/flotation tank, an anaerobic fermentation tank, an anaerobic ammoniation system, an OAO system and an electrocatalytic ozone synergistic treatment system which are communicated in sequence.

The pretreatment system is used for carrying out sorting, crushing, dewatering and solid-liquid separation of kitchen waste. The centrifuge is used for further separating liquid treated by the pretreatment system.

Through high-speed rotation of a rotator in the centrifuge, grease and waste water are further separated by different centrifugal forces. The centrifuge includes a transfer device and a screw conveyor with a hollow rotating shaft. Sludge is sent into a drum by the hollow rotating in shaft, and the product is thrown into a cavity of the drum under a centrifugal force generated by high-speed rotation. Due to different specific gravity, solid-liquid separation is achieved. Driven by the screw conveyor, the sludge is conveyed to a cone end of the drum and continuously discharged from an outlet. The liquid in a liquid ring layer is continuously "overflowed" from a weir to the outside of the drum and discharged by gravity.

The flocculation/flotation tank is used for removing suspended matters and microbubbles from the liquid treated by the centrifuge. By adding PAM (polyacrylamide) to the flocculation tank, suspended particles in the water are aggregated and become larger, or form floccules, to accelerate aggregation and precipitation of the particles and realize solid-liquid separation, so that suspended matters, organic matters, colloids and other substances in the waste water are removed, and the COD (Chemical Oxygen Demand) is also reduced. The flotation tank absorbs the fine suspended matters in the water through generated fine bubbles, so that the fine suspended matters float onto the water surface with the bubbles, and the water quality is improved.

The anaerobic fermentation tank is used for removing organic matters in the liquid. In the anaerobic fermentation tank, the organic matters in the kitchen waste water is hydrolyzed, acidified and methanated by anaerobic bacteria under anaerobic conditions, so that the organic matters in the waste water are removed, thereby facilitating subsequent anaerobic ammonia oxidation for further treatment. Generated biogas is treated by a biogas purification system, and biogas residue is dehydrated for aerobic degradation composting.

The anaerobic ammoniation system is used for removing ammonia nitrogen and total nitrogen in the liquid. The OAO system is used for removing COD in the liquid and carrying out denitrification and sludge-water separation.

The electrocatalytic ozone synergistic treatment system is used for rapidly degrading the organic matters in the liquid and removing the COD, so that the waste water reaches the discharge standard. The electrocatalytic ozone synergistic treatment system is coupled with electrochemistry and ozone technology. More hydroxyl radicals can be generated by ozone on the basis of electrochemical reaction, and the catalytic efficiency of ozone is further improved, so that pollutants are removed quickly and efficiently, and the cost is reduced. The COD removal rate of the treatment technology can reach over 80%, and the waste water reaches the discharge standard without secondary pollution.

The pretreatment system includes a receiving hopper, a sorting machine, a crushing filter press and a three-phase separator which are connected in sequence. The receiving hopper is used for receiving the kitchen waste. The sorting machine is used for carrying out coarse sorting of the kitchen waste. The crushing filter press is used for crushing and dewatering the kitchen waste. The three-phase separator is used for separating water, grease and solid matters from the kitchen waste. A water outlet of the three-phase separator is communicated with the centrifuge. The kitchen waste is sorted to sort out metals, plastics and other impurities. The sorted waste enters the crushing filter press for crushing and dehydration. The particle size of the crushed material is about 2 mm. The filter residue enters an aerobic degradation tank for composting. A filtrate enters the three-phase separator for solid-liquid-oil three-phase separation. The grease enters a grease storage tank and is handed over to a qualified enterprise for treatment. The filter residue is composted, and the waste water is treated in the next step.

The synergistic device in the embodiment further includes an aerobic degradation tank. A filter residue outlet of the crushing filter press and a solid matter outlet of the three-phase separator are respectively communicated with the aerobic degradation tank.

A biogas outlet of the anaerobic fermentation tank is communicated with a biogas purification system. The filter residue outlet of the anaerobic fermentation tank is communicated with a biogas residue dehydrator. The biogas residue dehydrator is communicated with the aerobic degradation tank. A filtrate outlet of the biogas residue dehydrator is communicated with the anaerobic ammoniation system. Effluent water from the anaerobic fermentation tank flows into an anaerobic ammonia oxidation tank. Most of ammonia nitrogen and total nitrogen in the waste water are removed by anaerobic ammonia oxidation bacteria. Then, the effluent water from the anaerobic ammonia oxidation tank flows to a primary sedimentation tank for sludge-water separation, and the sludge flows back to a front end of the anaerobic ammonia oxidation tank.

A slag outlet of the biogas purification system is communicated with the receiving hopper.

The biogas purification system includes a two-stage desulfurization equipment having a wet desulfurization equipment and a dry desulfurization equipment connected in series. The wet desulfurization equipment adopts processes of alkali spray and biological reaction recovery, and the dry desulfurization equipment adopts an iron oxide process for desulfurization. In case the sulfur content is high, the sulfur content is reduced by the wet desulfurization equipment, and then the desulfurization effect and stability are ensured by the dry desulfurization equipment. In case the sulfur content is low, the dry desulfurization equipment is adopted without adopting the wet desulfurization equipment. The generated biogas is used as a fuel for a pretreatment steam boiler, so that the operation reliability can be guaranteed, and the operation cost can also be reduced.

The anaerobic fermentation tank is a mechanically stirred CSTR anaerobic reactor. The processes of filtrate fermentation and biogas production are completed in the anaerobic fermentation tank. A stirring device is installed in the anaerobic reactor, so that fermentation raw materials and microorganisms completely mixed. Through single-phase medium-temperature anaerobic fermentation, the newly entered raw materials are quickly mixed with acid-forming bacteria and methanogenic bacteria in the fermentation tank of the anaerobic reactor due to stirring, so that the concentration of a fermentation substrate is always kept relatively low, the overall operation is stable, and the energy consumption is low.

The anaerobic ammoniation system includes an anaerobic ammonia oxidation tank and a primary sedimentation tank which are communicated in sequence. The anaerobic ammonia oxidation tank is communicated with the anaerobic fermentation tank. The primary sedimentation tank is communicated with the OAO system. Most of ammonia nitrogen and total nitrogen are removed by the anaerobic ammonia oxidation bacteria in the anaerobic ammonia oxidation tank. The effluent water flows to the primary sedimentation tank for sludge-water separation. Part of sludge flows back to the front end of the anaerobic ammonia oxidation tank. The effluent water flows into the aeration tank of OAO process for treatment.

The OAO system includes an aeration tank, a secondary sedimentation tank, an A/O tank and a tertiary sedimentation tank which are arranged in sequence. The aeration tank is communicated the anaerobic ammoniation system. The tertiary sedimentation tank is communicated with the electrocatalytic ozone synergistic treatment system. The effluent water from the primary sedimentation tank flows into the aeration tank, so that a large quantity of organic substances are degraded, and the removal rate of COD is improved. Moreover, under aerobic conditions, toxic and harmful substances such as sulfide in the waste water can be degraded. The waste water treated by the aeration tank and the secondary sedimentation tank enters the A/O tank for advanced denitrification. The effluent water from the A/O tank flows to the tertiary sedimentation tank for sludge-water separation. A sludge reflux pump is provided, and the sludge flows back to the front end of the A/O tank. The waste water enters the aeration tank by controlling the aeration quantity of the aeration tank, so that a large quantity of organic matters are removed without damaging the subsequent anaerobic environment. A sludge reflux system is provided, so that the sludge from the secondary sedimentation tank flows back to the front end of the aeration tank to maintain sufficient carbon source in the whole process. The effluent water from the secondary sedimentation tank enters the A/O tank for nitrogen and phosphorus removal, and the waste water is finally discharged after solid-liquid separation in the tertiary sedimentation tank, and the precipitated sludge flows back to the front end of the A/O tank, so as to enable the effluent water to reach the discharge standard.

The synergistic device for resource and energy recovery, pollution reduction and carbon reduction of kitchen waste in the embodiment further includes a grease storage tank. The grease storage tank is used for collecting grease separated by the pretreatment system and the centrifuge.

In the embodiment of the synergistic device for resource and energy recovery, pollution reduction and carbon reduction of kitchen waste, in the kitchen waste, the COD is 80000-100000 mg/L, the grease content is 30%-40%, and the TN (Total Nitrogen) content is 2%-3%. In the organic waste water after degrease removal of the kitchen waste, COD is less than or equal to 18000 mg/L, $BOD_5$ (Biochemical oxygen demand) is less than or equal to 7200 mg/L, TN is less than or equal to 1800 mg/L, NH3-N is less than or equal to 1350 mg/L, SS (Suspended Solid) is less than or equal to 1800 mg/L, and pH is 6-9. In the effluent water after treatment, COD is less than or equal to 500 mg/L, $BOD_5$ is less than or equal to 300 mg/L, TN is less than or equal to 45 mg/L, NH3-N is less than or equal to 35 mg/L, SS is less than 400 mg/L, and pH is 6-9.

It needs to be noted that for those skilled in the art, obviously the present disclosure is not limited to the details of the exemplary embodiment. And the present disclosure may be realized in other specific forms without departing from the spirit or essential characteristics of the present disclosure. Therefore, the embodiments is considered as exemplary and not restrictive in all respects. The scope of the present disclosure is defined by the appended claims, rather than the foregoing description. Accordingly, all changes that come within the meanings and scopes of equivalency elements of the claims are intended to be embraced in the present disclosure. Any reference signs in the claims shall not be construed as limitation to the claims referred to.

Specific examples are used for illustration of the principles and implementation methods of the present disclosure. The description of the above-mentioned embodiments is used to help illustrate the method and the core principles of the present disclosure. And, those skilled in the art should make various modifications in terms of specific embodiments and scope of application in accordance with the teachings of the present disclosure. In conclusion, the content of this specification shall not be construed as limitation to the present disclosure.

What is claimed is:

1. A synergistic device for resource and energy recovery, pollution reduction and carbon reduction of kitchen waste, comprising a pretreatment system, a centrifuge, a flocculation/flotation tank, an anaerobic fermentation tank, an anaerobic ammoniation system, an OAO (Oxic Anoxic Oxic) system and an electrocatalytic ozone synergistic treatment system which are communicated in sequence, wherein the pretreatment system is used for carrying out sorting, crushing, dewatering and solid-liquid separation of kitchen waste; the centrifuge is used for further separating liquid treated by the pretreatment system;

the flocculation/flotation tank is used for removing suspended matters and microbubbles from the liquid treated by the centrifuge: the anaerobic fermentation tank is used for removing organic matters in the liquid: the anaerobic ammoniation system is used for removing ammonia nitrogen and total nitrogen in the liquid: the OAO system is used for removing COD (Chemical Oxygen Demand) in the liquid and carrying out denitrification and sludge-water separation; and the electrocatalytic ozone synergistic treatment system is used for rapidly degrading the organic matters in the liquid and removing the COD so as to enable waste water to reach a discharge standard.

2. The synergistic device for resource and energy recovery, pollution reduction and carbon reduction of kitchen waste according to claim 1, wherein the pretreatment system comprises a receiving hopper, a sorting machine, a crushing filter press and a three-phase separator which are connected in sequence: the receiving hopper is used for receiving the kitchen waste, the sorting machine is used for carrying out coarse sorting of the kitchen waste, the crushing filter press is used for crushing and dewatering the kitchen waste, and the three-phase separator is used for separating water, grease and solid matters from the kitchen waste; and a water outlet of the three-phase separator is communicated with the centrifuge.

3. The synergistic device for resource and energy recovery, pollution reduction and carbon reduction of kitchen waste according to claim 2, further comprising an aerobic degradation tank, and a filter residue outlet of the crushing filter press and a solid matter outlet of the three-phase separator are respectively communicated with the aerobic degradation tank.

4. The synergistic device for resource and energy recovery, pollution reduction and carbon reduction of kitchen waste according to claim 3, wherein a biogas outlet of the anaerobic fermentation tank is communicated with a biogas purification system, a filter residue outlet of the anaerobic fermentation tank is communicated with a biogas residue dehydrator, the biogas residue dehydrator is communicated with the aerobic degradation tank, and a filtrate outlet of the biogas residue dehydrator is communicated with the anaerobic ammoniation system.

5. The synergistic device for resource and energy recovery, pollution reduction and carbon reduction of kitchen waste according to claim 4, wherein a slag outlet of the biogas purification system is communicated with the receiving hopper.

6. The synergistic device for resource and energy recovery, pollution reduction and carbon reduction of kitchen waste according to claim 4, wherein the biogas purification system comprises a two-stage desulfurization equipment having a wet desulfurization equipment and a dry desulfurization equipment connected in series, the wet desulfurization equipment adopts processes of alkali spray and biological reaction recovery, and the dry desulfurization equipment adopts an iron oxide process for desulfurization: in case sulfur content is high, the sulfur content is reduced by the wet desulfurization equipment, and then desulfurization effect and stability are ensured by the dry desulfurization equipment; and in case the sulfur content is low, the dry desulfurization equipment is adopted without adopting the wet desulfurization equipment.

7. The synergistic device for resource and energy recovery, pollution reduction and carbon reduction of kitchen waste according to claim 4, wherein the anaerobic fermentation tank is a mechanically stirred CSTR (Continuous Stirred Tank Reactor) anaerobic reactor.

8. The synergistic device for resource and energy recovery, pollution reduction and carbon reduction of kitchen waste according to claim 1, wherein the anaerobic ammoniation system comprises an anaerobic ammonia oxidation tank and a primary sedimentation tank which are communicated in sequence, the anaerobic ammonia oxidation tank is communicated with the anaerobic fermentation tank, and the primary sedimentation tank is communicated with the OAO system.

9. The synergistic device for resource and energy recovery, pollution reduction and carbon reduction of kitchen waste according to claim 1, wherein the OAO system comprises an aeration tank, a secondary sedimentation tank, an A/O (Anoxic/Oxic) tank and a tertiary sedimentation tank which are arranged in sequence; the aeration tank is communicated with the anaerobic ammoniation system, and the tertiary sedimentation tank is communicated with the electrocatalytic ozone synergistic treatment system.

10. The synergistic device for resource and energy recovery, pollution reduction and carbon reduction of kitchen waste according to claim 1, further comprising a grease storage tank, wherein the grease storage tank is used for collecting grease separated by the pretreatment system and the centrifuge.

* * * * *